US009077566B2

(12) United States Patent
Campion et al.

(10) Patent No.: US 9,077,566 B2
(45) Date of Patent: Jul. 7, 2015

(54) CALLER ID CALLBACK AUTHENTICATIONI FOR VOICE OVER INTERNET PROTOCOL ("VOIP") DEPLOYMENTS

(75) Inventors: Nicholas F. Campion, Rochester, MN (US); Michael J. Carpenter, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 12/714,595

(22) Filed: Mar. 1, 2010

(65) Prior Publication Data

US 2011/0211572 A1 Sep. 1, 2011

(51) Int. Cl.
*H04L 12/66* (2006.01)
*H04M 15/06* (2006.01)
*H04M 15/00* (2006.01)

(52) U.S. Cl.
CPC ............... *H04L 12/66* (2013.01); *H04M 15/06* (2013.01); *H04M 15/56* (2013.01)

(58) Field of Classification Search
CPC . H04L 29/06027; H04L 12/66; H04M 7/006; H04M 15/06; H04M 15/56
USPC ......... 370/352–356, 230; 379/142.05, 210.02
See application file for complete search history.

(56) References Cited

U.S. PATENT DOCUMENTS

| 7,164,759 | B2 * | 1/2007 | Lebowitz et al. ........ 379/142.03 |
| 7,702,081 | B1 * | 4/2010 | Klesper et al. ................. 379/45 |
| 7,912,192 | B2 * | 3/2011 | Kealy et al. .............. 379/114.14 |
| 8,081,747 | B2 * | 12/2011 | Bangor et al. ........... 379/210.02 |
| 8,094,800 | B1 * | 1/2012 | Smith et al. .............. 379/210.02 |
| 8,238,532 | B1 * | 8/2012 | Cox et al. ................. 379/114.14 |
| 8,243,716 | B2 * | 8/2012 | Liu et al. ........................ 370/352 |
| 8,249,232 | B2 * | 8/2012 | Fotta et al. .................... 379/196 |
| 8,274,968 | B2 * | 9/2012 | Rosenberg et al. ........... 370/353 |
| 8,396,201 | B1 * | 3/2013 | T et al. .................... 379/210.01 |
| 2004/0234052 | A1 * | 11/2004 | Lebowitz et al. .......... 379/88.19 |
| 2006/0167871 | A1 * | 7/2006 | Sorenson et al. .................. 707/6 |
| 2006/0182029 | A1 * | 8/2006 | Kealy et al. .................... 370/230 |
| 2007/0071200 | A1 * | 3/2007 | Brouwer .................. 379/142.05 |
| 2007/0121596 | A1 * | 5/2007 | Kurapati et al. .............. 370/356 |
| 2007/0211867 | A1 * | 9/2007 | Polk et al. ........................ 379/45 |

(Continued)

OTHER PUBLICATIONS http://www.cisco.com/en/US/docs/ios/12_0/dial/configuration/guide/dccallid.html, "Configuring ISDN Caller ID Callback", Cisco IOS Release 12.0 Dial Solutions Configuration Guide, printed Feb. 19, 2010.
http://findarticles.com/p/articales/mi_pwwi/is_20050229/ai_mark2709572105, "CipherTrust to Support Merged SPF and Caller ID Sender Authentication Protocol", Market Wire, printed Feb. 19, 2010.

*Primary Examiner* — Khaled Kassim
(74) *Attorney, Agent, or Firm* — Matthew J. Bussan (57) ABSTRACT

Systems and methods are disclosed for authenticating caller identification in VoIP communication. A VoIP device receives an incoming call from an originating calling device; wherein the incoming call includes (1) a caller identification and (2) a unique identifier associated with the originating calling device. The VoIP device verifies that the caller identification in the received incoming call matches an entry in a trusted directory, wherein the trusted directory includes one or more entries of previously verified caller identifications. Upon verifying that the caller identification in the received incoming call matches a caller identification entry in the trusted directory, the VoIP device sends an inquiry to a unique locator associated with the matching caller identification in the trusted directory.

16 Claims, 6 Drawing Sheets

(56) References Cited

U.S. PATENT DOCUMENTS

| | | | |
|---|---|---|---|
| 2008/0271126 A1* | 10/2008 | Saraf et al. | 726/5 |
| 2008/0292077 A1* | 11/2008 | Vinokurov et al. | 379/142.04 |
| 2009/0217039 A1* | 8/2009 | Kurapati et al. | 713/168 |
| 2010/0002686 A1* | 1/2010 | Rosenberg et al. | 370/352 |
| 2010/0173618 A1* | 7/2010 | Kass et al. | 455/414.1 |
| 2010/0329241 A1* | 12/2010 | Ryou et al. | 370/352 |
| 2010/0329453 A1* | 12/2010 | Mehmood et al. | 380/44 |
| 2011/0211682 A1* | 9/2011 | Singh et al. | 379/142.05 |

* cited by examiner

CALLER ID CALLBACK AUTHENTICATIONI FOR VOICE OVER INTERNET PROTOCOL ("VOIP") DEPLOYMENTS

BACKGROUND

1. Field of the Invention

The field of invention relates to Voice over Internet Protocol ("VoIP") security. In particular, the field of invention relates to verifying caller ID authenticity in VoIP communication.

2. Description of the Related Art

With the advent of Voice over Internet Protocol (VoIP), capabilities ubiquitous to legacy public switched telephone networks (PSTN) systems are being made commonly available for VoIP deployments. Caller ID is one of those capabilities now common in VoIP deployments. Unfortunately, the ability to spoof the contents of a caller ID and or a callers phone number in the display is easy to accomplish in a VoIP initiated phone call. In particular, VoIP makes it easy for fraudulent callers to insert an identifying name different from the actual identity of the fraudulent caller.

Fraudulent credentials in a caller ID description make "phishing" techniques appear more credible leading to potential exposure of secure information. The situation has become so pervasive that caller ID authenticity is readily viewed as worthless amongst the IP telephony community. Indeed, VoIP industry leaders are beginning to acknowledge that the anonymity of the internet and audio medium of telephony could make SPIT (Spam over Internet Telephony) a bigger problem for consumers than SPAM is today. There is a growing need for a VoIP solution that verifies a caller id is authentic to thwart phishing scams and SPIT campaigns which could severely limit the adoption of VoIP technology.

SUMMARY

In a first embodiment of the invention, a method for authenticating caller identification in VoIP communication is provided. The method comprises configuring one or more processors to perform an operation comprising receiving an incoming call from an originating calling device; wherein the incoming call includes (1) a caller identification and (2) a unique identifier associated with the originating calling device; verifying that the caller identification in the received incoming call matches an entry in a trusted directory; wherein the trusted directory includes one or more entries of previously verified caller identifications; and upon verifying that the caller identification in the received incoming call matches a caller identification entry in the trusted directory, sending an inquiry to a unique locator associated with the matching caller identification in the trusted directory.

In a second embodiment of the invention, a computer readable storage medium containing a program is provided. The program when executed performs an operation for authenticating caller identification in VoIP communication, comprising receiving an incoming call from an originating calling device; wherein the incoming call includes (1) a caller identification and (2) a unique identifier associated with the originating calling device; verifying that the caller identification in the received incoming call matches an entry in a trusted directory; wherein the trusted directory includes one or more entries of previously verified caller identifications; and upon verifying that the caller identification in the received incoming call matches a caller identification entry in the trusted directory, sending an inquiry to a unique locator associated with the matching caller identification in the trusted directory.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention validates caller ID to enable VoIP users to distinguish between a authenticated call and a non-authenticated call. Indirect attempts to handle the spoofing problem are inadequate as fraudulent VoIP callers are able to modify all aspects of information sent over the network. Attempts to do loose validation by attempting to identify known spoofing domains are also inadequate. Finally, alternative efforts that specifically include call back function, fail to address caller ID spoofing and relate instead to controlling phone charges. As a result, such systems fail to include the additional step of verifying call initiation.

Figure 1:
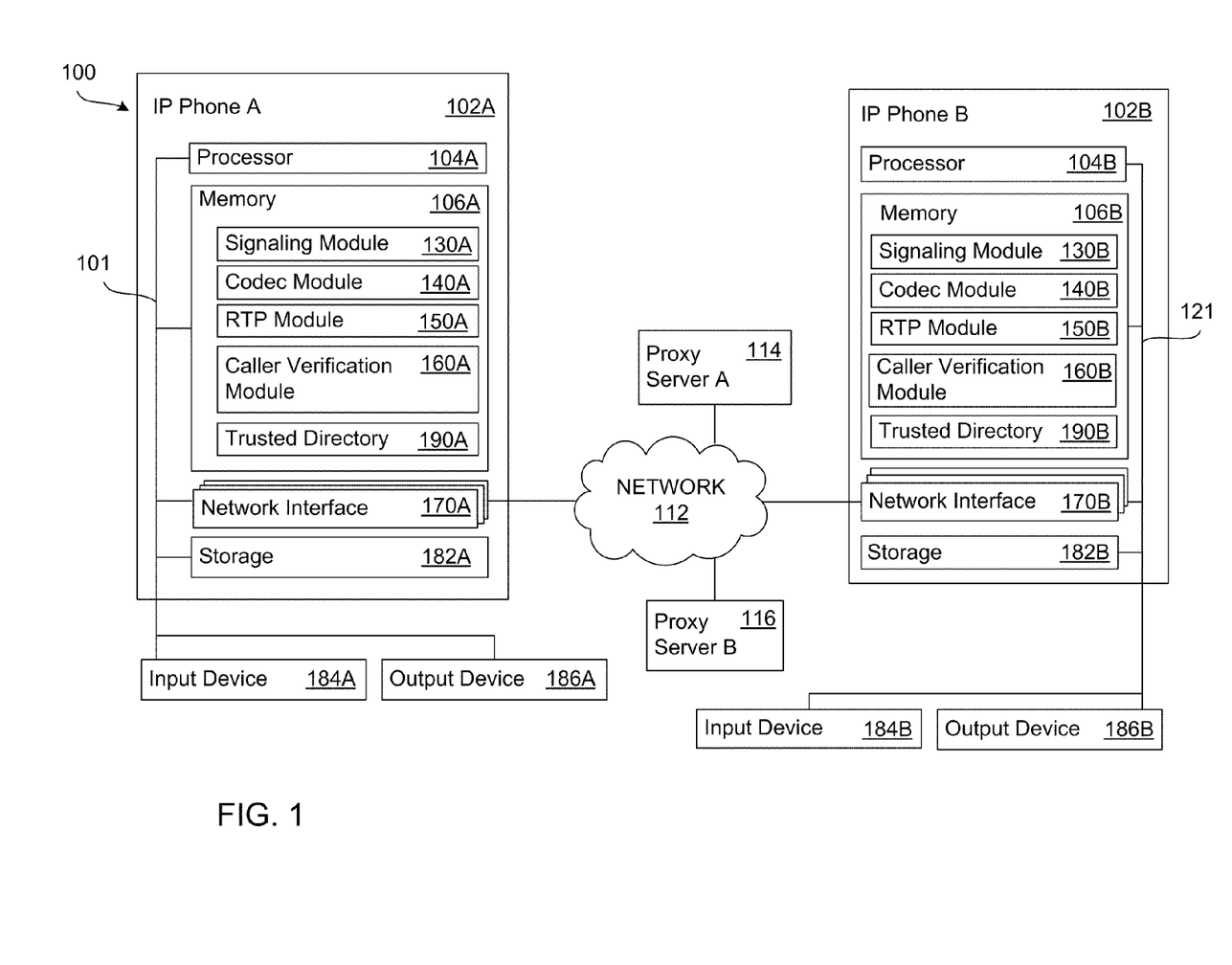
FIG. 1 is a block diagram illustrating a system for exchanging VoIP communication between two IP phone devices, wherein each device is configured to authenticate caller identification, according to one embodiment of the invention.

FIG. 1 is a block diagram illustrating a system for exchanging VoIP communication between two IP phone devices, wherein each device is configured to authenticate caller identification. In particular, the illustration shows two instances of a system configured to authenticate caller identification, wherein the first instance is identified with an "A" and the second instance is identified with a "B" and wherein the systems are networked. The networked system includes a first IP phone, (hereinafter "IP Phone A" 102A) and a second IP phone (hereinafter "IP Phone B" 102B), both configured to receive calls over a computer network. IP Phone A 102A and IP phone B 102B are connected via a network 112, wherein the network may be the Internet, for example. In a particular embodiment, initial voice transmission between IP Phone A 102A and IP Phone B 102B is handled by a first proxy server, proxy server A 114, and a second proxy server, proxy server B 116. The proxy servers may, for example, route call requests to the appropriate user locations, authenticate and authorize users, and implement call routing policies.

Each instance of IP Phone (102A and 102B) generally includes a processor 104 connected via a bus 101 to a memory 106, a network interface 170A, a storage 182, an input device 184, and an output device 186.

The memory 106 may be a random access memory. While the memory 106 is shown as a single entity, it should be understood that the memory 106 may in fact comprise a plurality of modules, and that the memory 106 may exist at multiple levels, from high speed registers and caches to lower speed but larger storage capacity DRAM chips.

As shown, the memory 106 includes a signaling module 130, a codec module 140, a Real-time Transport Protocol (RTP) module 150, a caller verification module 160A, and a trusted directory 190. The signaling module 130, when executed on a processor 104, is configured to manage media communication sessions including voice and video calls, streaming media, and instant messaging for example. The signaling module 130 includes a signaling protocol such as Session Initiation Protocol (SIP), H.323, or Skinny Call Control Protocol (SCCP) for example. In an alternative embodiment, the signaling module 130 may additionally include extensions to the aforementioned signaling protocols. Hereinafter, embodiments of the invention are described in connection with SIP, but those of ordinary skill in the art will appreciate using alternative signaling protocols and related extensions, such as the aforementioned, for use with embodiments of the invention.

The codec module 140 is configured to encode and decode a digital data stream or signal. The RTP module 150 is configured to handle the transfer of multimedia data over the network. The caller verification module 160A is configured to extend the capabilities of the signaling protocol. The trusted directory 190A is configured to store a list of validated names and phone numbers and operates together with the caller verification module 160 as explained in further detail in FIG. 2.

The network interface 170 may be any entry/exit device configured to allow network communications between the IP phones (102A and 102B) via the network 112. For example, the network interface 170 may be a network adapter or other network interface card (NIC). In addition, the network interface 170 may be configured to establish one or more network connections.

The storage 182 may comprise a hard disk drive storage device. Although the storage 182 is shown as a single unit, the storage 182 may be a combination of fixed and/or removable storage devices, such as fixed disc drives, floppy disc drives, tape drives, removable memory cards, or optical storage. The memory 106 and the storage 182 may be part of one virtual address space spanning multiple primary and secondary storage devices.

The input device 184 may be any device for providing input to the IP phone A 102 and may include, for example, a headset and microphone. The output device 186 may be any device for providing output to a user of the IP phone and may be any conventional display screen or set of speakers, along with their respective interface cards, i.e., video cards and sound cards.

Those of ordinary skill in the art will appreciate that the system for exchanging VoIP communication may be modified to include more than two devices and may include, for example, any combination of softphone, IP phone, and standard phone devices, wherein standard phone devices are connected to foreign eXchange Office (FXO) gateways to allow plain old telephone systems (POTS) to connect to VoIP systems.

Figure 2:
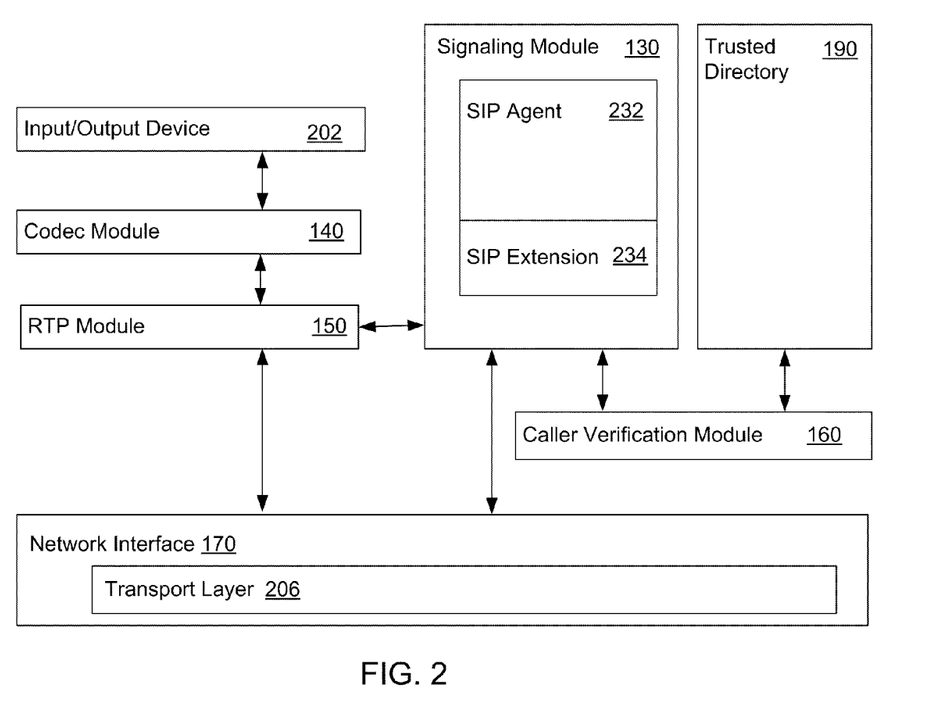
FIG. 2 is a block diagram illustrating in detail the memory modules of FIG. 1 for executing caller id authentication, according to one embodiment of the invention.

FIG. 2 is a block diagram illustrating in detail the modules of FIG. 1 for executing caller id authentication, according to one embodiment of the invention.

As shown, a caller verification module 160, such as caller verification modules 160A and 160B of FIG. 1, is configured to communicate with a trusted directory 190, such as trusted directories 190A and 190B. The caller verification module 160 is further configured to communicate with a signaling module 130, such as signaling modules 130A and 130B.

The signaling module 130 may include an SIP agent 232 and an SIP extension 234. Generally, the SIP agent 232 sends call invitations and receives a response from one or more VoIP devices via a network interface 170, wherein the response is either to accept or reject the invitation. In addition, the SIP agent 232 receives and responds to call invitations from one or more VoIP devices via the network interface 170. In one embodiment, the SIP agent 232 encrypts the call invitation request messages.

The SIP extension 234 extends the standard SIP parameters to include parameters that enable caller verification. In one embodiment, the additional parameters in the SIP extension 234 include a call verification request parameter, a call verification response parameter, and a call verification session ID as described in further detail in FIG. 3. In an alternative embodiment, the call verification session ID is the same as the call session ID generated by the SIP based VoIP call.

In one embodiment, the signaling module 130 is configured to receive a call invitation request from a VoIP device on the network, wherein the call invitation request includes a unique call session ID and any combination of name, number, or ID, of the calling VoIP device (hereinafter "caller identification"). In response, the signaling module 160 is configured to pass the caller identification to the call verification module 160 and to receive a response from said call verification module 160. The call verification module 160 is configured to compare the received caller identification of the incoming call invitation request against caller identification entries in the trusted directory 190.

The caller verification module 160 is further configured to output to the signaling module 130 a Boolean output (i.e., TRUE or FALSE) indicating whether the caller identification is verified (hereinafter "trusted directory verification"), wherein the trusted directory verification indicates that a caller identification has a corresponding entry in the trusted directory 190. If verified, the caller identification module 160 is further configured to output caller identification information that resolves to an IP address by a caller resolution process via a trusted Domain Name Services process included in the VoIP device. In one embodiment, a no response indicates an unverified caller.

In one embodiment, a user may manually add caller identifications to the trusted directory 190. In an alternative embodiment, the call verification module 160 may add caller identifications to the trusted directory 190 based on a user defined security policy. For example, the system may automatically add a received caller identification to the trusted directory 190 if a user accepts a non-authenticated call and maintains a connection beyond a set amount of time as defined by policy (i.e., store caller identification if call connection is more than 3 minutes).

In an alternative embodiment, the caller verification module 160 outputs to the signaling module 130 a trust value that is subsequently evaluated as verified or unverified based on a user defined threshold. The trust value is evaluated by the caller verification module 160 based on characteristics of the caller ID, including, for example, the elapsed time from the date the caller identification was first verified and whether the caller identification was verified by a user or was automatically verified. For example, the caller identification module 160 would output a low trust value for a call where a significant period of time had elapsed since the caller ID was verified as compared with a recently verified caller ID. In contrast, the caller identification module 160 might set a high trust value for a call identification entry explicitly entered into the trusted directory 190 by the user. Additionally, a user may designate to assign a higher trust level value to a phone number associated with a residential phone contact as compared with a business contact, for example.

Thus, in one embodiment, the trusted directory 190 may be configured to store a time stamp indicating the date of verification of each caller identification entry and information related to the type of caller verified (e.g., residential vs. business.). In a further embodiment, the trusted directory 190 may be configured to tag caller identification entries with labels so as to enable the grouping of caller identifications. For example, the trusted directory 190 may be configured to label caller identifications by area code (e.g., all "507" area codes receive label "X") or alternatively to label caller identifications by groupings of numbers (e.g., all numbers beginning with "(507)-253-" are given label "Business Y").

The signaling module 130, upon receiving indication from the caller verification module 160 that the caller identification has received the trusted directory verification, is configured to send a call-back verification request to the unique locator, wherein the unique locator is resolved using the caller identification information retrieved from the trusted directory. In particular the unique locator is determined by resolving the verified caller identification entry from the trusted directory against a trusted Domain Name Services process for establishing the IP location of the verified caller ID. In other words, the caller verification module 160 is configured to connect to a trusted Domain Name Service process to resolve (i.e., retrieve IP address) the caller identification entry in the trusted directory. The call-back verification request includes the unique call verification session ID received in the initial call invitation. The signaling module 130 is further configured to receive a response to the call-back verification request, wherein the response indicates whether the caller is authenticated which is based on whether the responding device initiated the call.

The signaling module 130 is further configured to send a call invitation request to one or more VoIP devices, wherein the call invitation request includes a unique call session ID. In one embodiment, the signaling module 130 initiates the call verification module 160 to maintain a stateful awareness of calls that have been initiated and are awaiting authentication, but not yet connected. The signaling module 130 is further configured to receive call-back verification requests and respond by either confirming or denying call authenticity.

Figure 3:
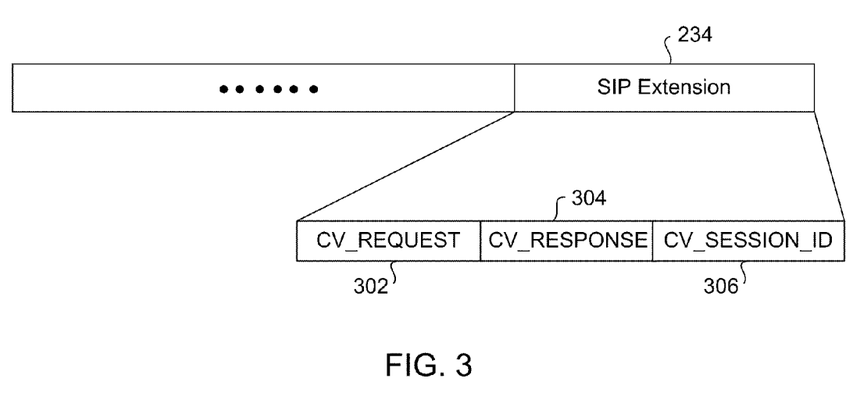
FIG. 3 is a block diagram illustrating an example of a structure of the SIP extension 234 of FIG. 2, according to one embodiment of the invention.

FIG. 3 is a block diagram illustrating an example of a structure of the SIP extension 234 of FIG. 2. In particular, FIG. 3 shows a block view of the SIP extension parameters 234, wherein the SIP extension parameters 234 include a call verification request parameter (CV_REQUEST 302), a call verification response parameter (CV_RESPONSE 304), and a call session ID (CV_SESSION_ID 306). As noted above, in an alternative embodiment, the call session ID is the same as that ID generated when establishing an SIP based VoIP call and thus no CV_SESSION_ID 306 is required.

The content of the CV_REQUEST 302 parameter indicates to a receiving device that call verification is enabled and is used to request verification from a VoIP device that the VoIP device initiated a call. The content of the CV_RESPONSE 304 is used by the VoIP device to either confirm or deny that it initiated a call. In one embodiment, the content of the CV_RESPONSE 304 parameter is populated by the caller verification module (160) of FIG. 2. The content of the CV_SESSION_ID 306 parameter includes a unique call session ID.

Figure 4:
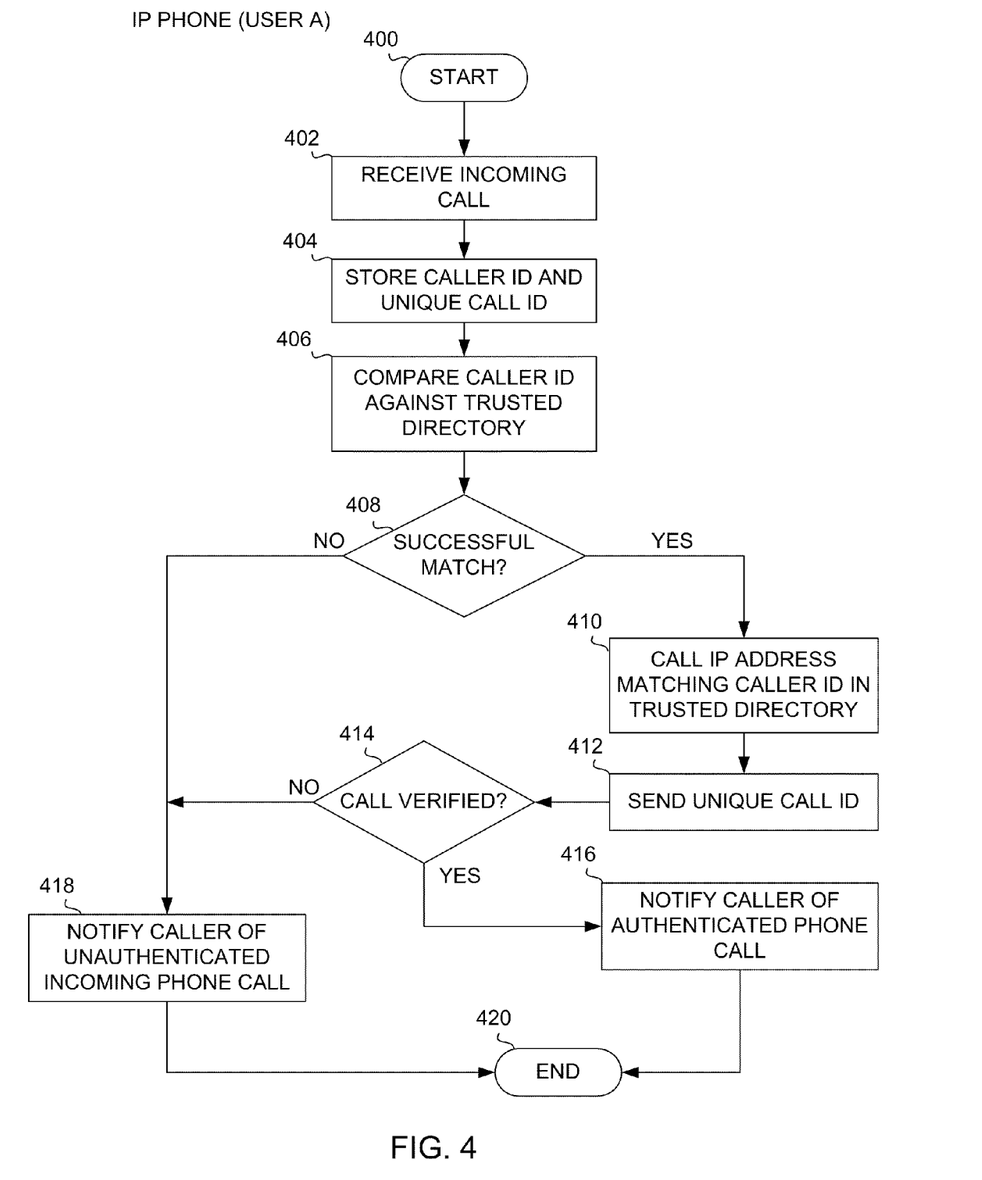
FIG. 4 is a flowchart illustrating the operation of a VoIP device with call verification enabled, according to one embodiment of the invention.

FIG. 4 is a flowchart illustrating the operation of a VoIP device with call verification enabled, according to one embodiment of the invention.

As shown, the process begins at block 400. At block 402, the IP phone receives an incoming phone call. At block 404, the IP phone stores a unique call session ID received from the incoming phone call and caller identification, wherein caller identification includes any combination of name, number, or ID. At block 406, the IP phone compares the caller identification with caller identification entries in a trusted directory. At block 408, the system determines if there is a successful match. If NO the IP phone notifies the caller of an unauthenticated incoming phone call at block 418 and control passes to block 420. At block 420, the process ends. It should be noted that the user may still choose to take the call after being notified of an unauthenticated call. In an alternative embodiment, the user may indicate a predefined action take place, such as an automated response, if the system determines the call is unauthenticated. If YES, control passes to block 410. At block 410, the IP phone calls the unique locator (e.g., TCP/IP address) matching caller ID in trusted directory. At block 412, the IP phone sends the unique call session ID (see block 404) to the VoIP phone initiating the call. At block 414, the IP phone determines if the call was verified. If YES, the IP phone notifies the caller of the authenticated phone call at block 416 and control passes to block 420. If NO, the IP phone notifies the caller of the unauthenticated phone call at block 418. At block 420, the process ends.

Figure 5:
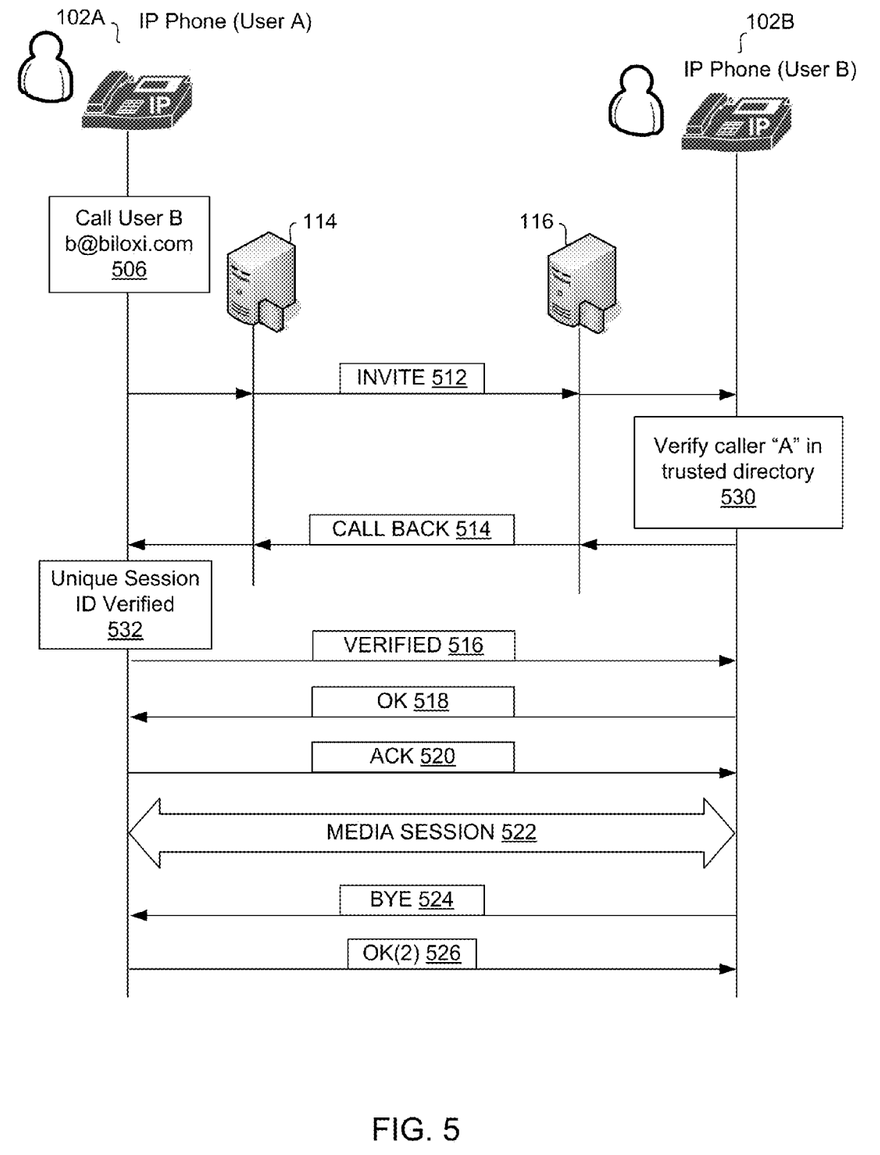
FIG. 5 is a diagram illustrating the operation of the call verification system in combination with the SIP protocol, according to one embodiment of the invention.

FIG. 5 is a diagram illustrating the operation of the call verification system in combination with the SIP protocol, according to one embodiment of the invention. User A initiates a call that sends, via an IP Phone A 102A, a call invitation to User B at b@biloxi.com 506, wherein the call invitation includes a caller identification and a unique call session ID. An INVITE 512 is directed through a first proxy server 114 and a second proxy server 116 to USER B to facilitate the establishment of a call session.

The IP phone B 102B verifies the caller identification of User A against a list of entries in a trusted directory. Upon verifying that an entry for User A is in the trusted directory, the IP phone B 102B sends a CALL BACK 514 to a unique locater. The unique locater is determined by verifying the caller identification entry from the trusted directory against a trusted Domain Name Services process for establishing the verified caller IDs IP location. The CALL BACK 514 includes the unique call session ID initially received in the call invitation and is sent to User A's unique locator via the second proxy server 116 and the first proxy server 114.

Upon receiving the CALL BACK 514 response, IP phone A 102A verifies that the unique session ID 532 matches the session ID created for the call invitation. If verified, the IP Phone A 102A sends a VERIFIED 516 confirmation direct to User B's unique identifier. The IP Phone B 102B then sends an acceptance (OK) 518 and, in response, the IP phone A 102A sends an acknowledgement (ACK) 616 response. After completing the call verification handshake, a media session 522 is established, enabling the exchange of media packets. At the end of the call User B hangs up and generates a BYE 524 message. IP Phone B 504 confirms receipt of the BYE 524 message with an OK message, thus terminating the media session 522 and the BYE transaction.

Figure 6:
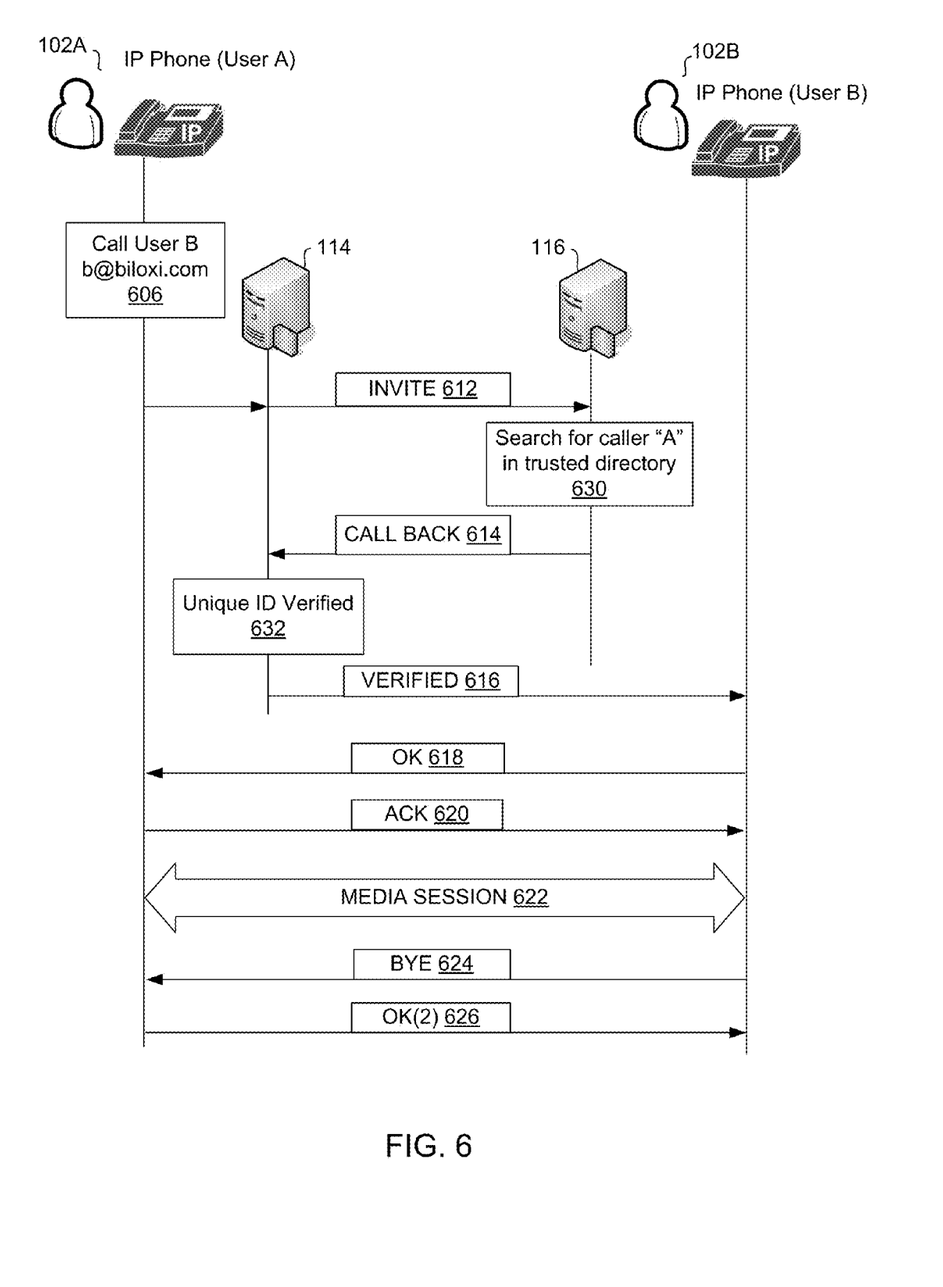
FIG. 6 is a diagram illustrating an alternative operation of the call verification system in combination with the SIP protocol wherein verification is handled by the proxy servers, according to one embodiment of the invention.

FIG. 6 is a diagram illustrating an alternative operation of the call verification system in combination with the SIP protocol wherein verification is handled by the proxy servers, according to one embodiment of the invention. Similar to FIG. 5, User A calls, via an IP Phone A 102A, User B 606 which generates a call invitation to User B at b@biloxi.com, wherein the call invitation includes a caller identification and a unique call session ID. Unlike FIG. 5, an INVITE 612 is directed through a first proxy server 114 which stores the unique call session ID. The INVITE 612 is received and processed by a second proxy server 116.

The second proxy server 116 includes (1) an agent for controlling the handshake between one or more VoIP devices, (2) a call verification module, and (3) a trusted directory as in FIG. 2. The second proxy server 116 verifies the caller identification of User A against a list of entries in a trusted directory. Upon verifying that an entry for User A is in the trusted directory, the second proxy server 116 sends a CALL BACK 614 to a unique locater stored in the trusted directory associated with the entry for User A. The CALL BACK 614 includes the unique call session ID initially received in the call invitation. The CALL BACK 614 is sent to User A's unique locater s received by the first proxy server 114. The unique locater is determined by verifying the caller identification entry from the trusted directory against a trusted Domain Name Services process for establishing the verified caller IDs IP location.

Upon receiving the CALL BACK 614 response, the first proxy server 114 verifies that the unique session ID 632 matches the session ID created for the call invitation. If verified, the first proxy server 114 sends a VERIFIED 616 confirmation direct to User B's unique identifier. The IP Phone B 604 then sends an acceptance (OK) 518 and, in response, the IP phone A 102A sends an acknowledgement (ACK) 616 response. After completing the call verification handshake, a media session 622 is established, enabling the exchange of media packets. At the end of the call User B hangs up and generates a BYE 624 message. IP Phone B 102B confirms receipt of the BYE 624 message with an OK message 626, thus terminating the media session 622 and the BYE transaction.

In an alternative embodiment, the first proxy server 114 and the second proxy server 116 reside with one or more private branch exchanges (PBX) serving User A and User B. In yet another embodiment, the trusted directories could be established and maintained by a third party provider. In such an embodiment, the trusted directory could be available to more than one user. Indeed, in one embodiment, the trusted directory could be globally available. Thus, any number of recipients of incoming calls could use the trusted directory to validate a phone number and business name. In a variation to the embodiment, the trusted directory may be configured to categorize caller identification entries into groups, wherein the groups are subsequently associated with trust levels, as previously disclosed, by the connected VoIP devices. VoIP devices using the globally available trusted directory could access designated groups of caller identification ("caller ID groups") entries in the trusted directory that are used for verification, wherein the access to caller ID groups could, for example, be based on industry or based on trust level.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for authenticating caller identification in VoIP communication comprising configuring one or more processors to perform an operation, comprising:
    receiving an incoming call from an originating calling device;
        wherein the incoming call is in the form of a call invitation request that includes (1) a caller identification and (2) a unique call session ID, wherein the caller identification includes at least one of a name, a number and an ID associated with the originating calling device;
    verifying that the caller identification in the received incoming call matches an entry in a trusted directory;
        wherein the trusted directory includes one or more entries of previously verified caller identifications;
    upon verifying that the caller identification in the received incoming call matches a caller identification entry in the trusted directory, sending a call back to a unique locator associated with the matching caller identification in the trusted directory;
        wherein the call back includes the unique call session ID; and
    sending a verification in response to the call back, wherein sending the verification includes:
        verifying whether or not the unique call session ID included in the call back matches the unique call session ID stored earlier,
        confirming that the originating calling device initiated the incoming call if the unique call session ID included in the call back matches the unique call session ID stored earlier, and
        denying that the originating calling device initiated the call if the unique call session ID included in the call back does not match the unique call session ID stored earlier;
    wherein the unique call session ID is created for the call invitation request, and wherein the call invitation request includes, within a session invitation protocol (SIP) extension, a call verification request parameter (CV REQUEST), a call verification response parameter (CV RESPONSE) that indicates whether or not the unique call session ID included in the call back matches the unique call session ID stored earlier, and a call verification session ID (CV SESSION ID) containing the unique call session ID.

2. The computer implemented method of claim 1 wherein the unique locator is determined by resolving the caller identification entry in the trusted directory via a trusted Domain Name Services process.

3. The computer implemented method of claim 1, further comprising notifying a user if the caller identification in the received incoming call does not match an entry in the trusted directory.

4. The computer implemented method of claim 1, wherein caller identifications are automatically added to the trusted directory based on a user defined security policy.

5. The computer implemented method of claim 1, wherein the trusted directory adds non-authenticated caller identifications to the trusted directory if the originating call is accepted and a connection is maintained longer than pre-defined amount of time.

6. A non-transitory computer readable storage medium containing a program which, when executed, performs an operation for authenticating caller identification in VoIP communication, comprising:
    receiving an incoming call from an originating calling device;
        wherein the incoming call is in the form of a call invitation request that includes (1) a caller identification and (2) a unique call session ID, wherein the caller identification includes at least one of a name, a number and an ID associated with the originating calling device;
    verifying that the caller identification in the received incoming call matches an entry in a trusted directory;
        wherein the trusted directory includes one or more entries of previously verified caller identifications;
    upon verifying that the caller identification in the received incoming call matches a caller identification entry in the trusted directory, sending a call back to a unique locator associated with the matching caller identification in the trusted directory;

wherein the call back includes the unique call session ID; and sending a verification in response to the call back, wherein sending the verification includes:

verifying whether or not the unique call session ID included in the call back matches the unique call session ID stored earlier, confirming that the originating calling device initiated the incoming call if the unique call session ID included in the call back matches the unique call session ID stored earlier, and denying that the originating calling device initiated the call if the unique call session ID included in the call back does not match the unique call session ID stored earlier;

wherein the unique call session ID is created for the call invitation request, and wherein the call invitation request includes, within a session invitation protocol (SIP) extension, a call verification request parameter (CV REQUEST), a call verification response parameter (CV RESPONSE) that indicates whether or not the unique call session ID included in the call back matches the unique call session ID stored earlier, and a call verification session ID (CV SESSION ID) containing the unique call session ID.

7. The non-transitory computer readable storage medium of claim 6 wherein the unique locator is determined by resolving the caller identification entry in the trusted directory via a trusted Domain Name Services process.

8. The non-transitory computer readable storage medium of claim 6, further comprising notifying a user if the caller identification in the received incoming call does not match an entry in the trusted directory.

9. The non-transitory computer readable storage medium of claim 6, wherein caller identifications are automatically added to the trusted directory based on a user defined security policy.

10. The non-transitory computer readable storage medium of claim 6, wherein the trusted directory adds non-authenticated caller identifications to the trusted directory if the originating call is accepted and a connection is maintained longer than pre-defined amount of time.

11. A system, comprising:
a processor; and
a memory containing a program, which when executed by the processor is configured to perform an operation for authenticating caller identification in VoIP communication, comprising:

receiving an incoming call from an originating calling device;

wherein the incoming call is in the form of a call invitation request that includes (1) a caller identification and (2) a unique call session ID, wherein the caller identification includes at least one of a name, a number and an ID associated with the originating calling device;

verifying that the caller identification in the received incoming call matches an entry in a trusted directory;

wherein the trusted directory includes one or more entries of previously verified caller identifications;

upon verifying that the caller identification in the received incoming call matches a caller identification entry in the trusted directory, sending a call back to a unique locator associated with the matching caller identification in the trusted directory;

wherein the call back includes the unique call session ID; and sending a verification in response to the call back, wherein sending the verification includes:

verifying whether or not the unique call session ID included in the call back matches the unique call session ID stored earlier, confirming that the originating calling device initiated the incoming call if the unique call session ID included in the call back matches the unique call session ID stored earlier, and denying that the originating calling device initiated the call if the unique call session ID included in the call back does not match the unique call session ID stored earlier;

wherein the unique call session ID is created for the call invitation request, and wherein the call invitation request includes, within a session invitation protocol (SIP) extension, a call verification request parameter (CV REQUEST), a call verification response parameter (CV RESPONSE) that indicates whether or not the unique call session ID included in the call back matches the unique call session ID stored earlier, and a call verification session ID (CV SESSION ID) containing the unique call session ID.

12. The system of claim 11 wherein the unique locator is determined by resolving the caller identification entry in the trusted directory via a trusted Domain Name Services process.

13. The system of claim 11, further comprising notifying a user if the caller identification in the received incoming call does not match an entry in the trusted directory.

14. The system of claim 11, wherein caller identifications are automatically added to the trusted directory based on a user defined security policy.

15. The system of claim 11, wherein the trusted directory adds non-authenticated caller identifications to the trusted directory if the originating call is accepted and a connection is maintained longer than pre-defined amount of time.

16. A computer implemented method for authenticating caller identification in VoIP communication comprising configuring one or more processors to perform an operation, comprising:

initiating a call to a receiving device;

wherein the initiated call is in the form of a call invitation request that includes (1) a caller identification and (2) a unique call session ID, wherein the caller identification includes at least one of a name, a number and an ID;

maintaining a stateful awareness of the initiated call and storing the unique call session ID;

receiving in response a call back, wherein the call back includes the unique call session ID;

comparing the unique call session ID in the call back with the stored unique call session ID; and sending a verification in response to the call back, wherein sending the verification includes:

verifying whether or not the unique call session ID included in the call back matches the unique call session ID stored earlier, confirming that the originating calling device initiated the incoming call if the unique call session ID included in the call back matches the unique call session ID stored earlier, and denying that the originating calling device initiated the call if the unique call session ID included in the call back does not match the unique call session ID stored earlier;

wherein the unique call session ID is created for the call invitation request, and wherein the call invitation request includes, within a session invitation protocol (SIP) extension, a call verification request parameter (CV REQUEST), a call verification response parameter (CV RESPONSE) that indicates whether or not the unique call session ID included in the call back matches the unique call session ID stored earlier, and a call verification session ID (CV SESSION ID) containing the unique call session ID.

* * * * *